Figure 1:
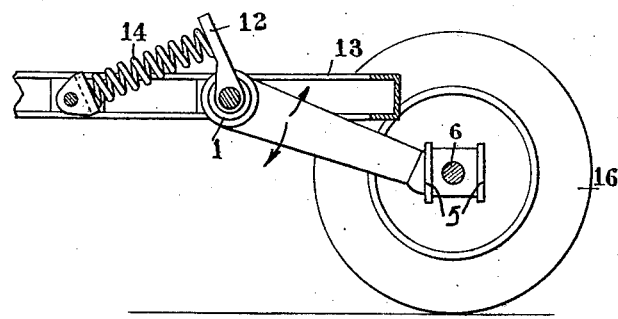

Dec. 10, 1957  A. BRUEDER  2,815,961
SPRUNG AXLE FOR AUTOMOTIVE VEHICLES
Filed Aug. 13, 1956

2,815,961
SPRUNG AXLE FOR AUTOMOTIVE VEHICLES

Antoine Brueder, Paris, France, assignor to Société Anonyme Andre Citroen, Paris, France Application August 13, 1956, Serial No. 603,548

Claims priority, application France June 13, 1956

4 Claims. (Cl. 280—124)

This invention relates in general to suspension systems of vehicles and more particularly to an improved axle construction.

In suspension systems of automotive vehicles certain requirements must be met regarding both the resistance to bending and torsional stresses and the constancy of the dimensional parameters governing the position and angular setting of the wheels.

This is particularly true in the case of rear wheels which, as a rule, have no steering functions and should constantly remain in the plane of their rims irrespective of the movements caused by road irregularities.

Moreover, road reactions, as far as possible, should not be transmitted to the vehicle body, for the sake of comfort and road balance.

Now in conventional suspension systems of automotive vehicles the road reactions applied in the longitudinal direction are controlled mainly by the tires or act on the suspension in the same way as vertical impulses.

The axle construction according to this invention is designed mainly for non-driving axles and characterized in that the vertical and transverse swinging movements of the suspension system of which the axle forms an integral part are separate and each adapted to be controlled by the most convenient resilient force.

In addition, the shocks applied by road inequalities in the longitudinal direction are damped out by a resilient assembly which is flexible only in the direction of motion of the vehicle but not vertically or transversely.

An axle of this improved type is comprised of a first assembly adapted to swing about a transverse axis and to damp out vertical or bending impulses of the vehicle, of another assembly oscillating about a longitudinal axis for damping out the torsional impulses applied to the vehicle, and of a third assembly consisting of a resilient device supporting directly each wheel and damping out shocks in the longitudinal direction.

The first assembly is swingable about a horizontal shaft rigid with the frame of the vehicle; its movements are checked by a resilient member such as a spring, a rubber pad or the like, a pneumatic or hydropneumatic cylinder, etc.

The second assembly is swingable about a longitudinal axis which may be either a torsion bar or simply a geometrical axis, the balancing force being provided in this case by one of the aforesaid suitable resilient means.

The third assembly is operatively connected to the second assembly so that any movement of the latter is attended by a corresponding movement of the former. It comprises mainly resilient elements supporting the axle wheels.

These elements are so arranged that their direction of flexing is in a horizontal plane and that they have a sufficient inertia in the vertical direction to avoid any appreciable deflection in this direction.

Thus, any shocks occurring in the direction of motion of the vehicle will not influence to any appreciable extent the suspension system proper and on the other hand the wheels will actually move in directions parallel to the plane of their rims.

Figure 2:
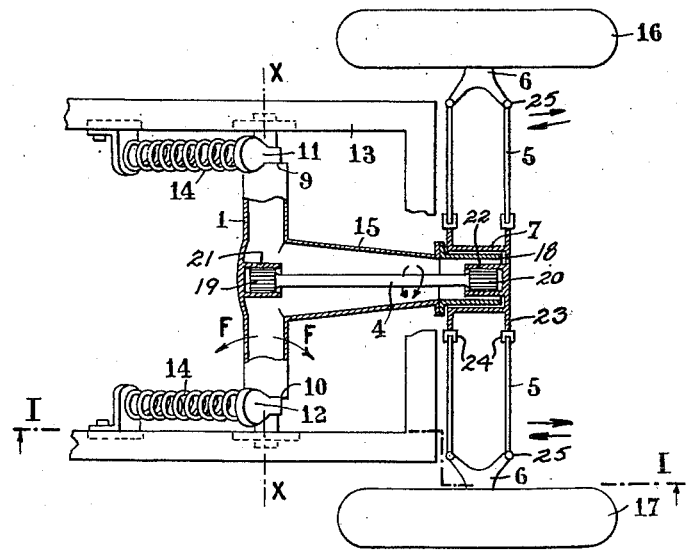

In order to afford a clearer understanding of the invention and of the manner in which the same may be carried out in the practice, reference will now made to the attached drawing forming part of this specification and illustrating diagrammatically by way of example a typical embodiment of the invention. In the drawing:

Figure 1 is a part-sectional view of an axle of an automotive vehicle which is constructed in accordance with the teachings of the invention, the section being taken upon the line I—I of Fig. 2, and Figure 2 is a part-sectional view of the same axle as seen from above.

The axle illustrated in the drawing is comprised of a tubular member 1 mounted and supported at either ends 9, 10 across the frame 13 of the vehicle by registering pins on which are pivoted arms 11, 12 rigid with the tubular member 1 and controlled by springs 14 or like resilient elements; therefore, this tubular member 1 is adapted to oscillate about the transverse axis X—X as indicated by the arrows F, and the vertical impulses applied to this tubular element 1, which correspond to the flexing of the vehicle under varying load and road conditions, are damped out by the resilient elements 14; these are shown in the form of coil springs, but it is evident that different spring types, rubber pads, pneumatic or hydropneumatic cylinders may be used as an alternative.

The tubular element 1 has secured in its middle an integral tapered housing 15 having its longitudinal axis co-planar with that of the vehicle; this housing 15 has its outer, small end 18 pivotally mounted in a hub 7 adapted in turn to pivot about an axis-coplanar with the longitudinal axis of the vehicle.

This housing 15 may contain a torsion bar 4 having its splined ends 19, 20 engaged in corresponding splined sockets 21, 22 solid with the tubular member 1, on the one hand, and with an end disk 23 of hub 7, on the other hand.

Preferably, this torsion bar 4 is inclined to the axis of the tapered housing, that is, to the horizontal, to damp out the reactions that may develop in the steering system. The hub 7 may be controlled by resilient and damping means such as those described in connection with the tubular member 1. The hub 7, by oscillating about the longitudinal axis, will damp out the torsional reactions of the vehicle.

This hub 7 supports each wheel 16, 17 of the axle through resilient members 5 consisting, for example, of flexible arms or lead springs having one end pivoted or otherwise mounted on the hub 7, and the other end pivoted at 25 on the wheel-carrying members 6 so that the resilient members 5 may deflect in the horizontal plane while having a substantial inertia in the vertical direction.

With this arrangement the wheels will constantly move in directions parallel to their planes, irrespective of their deflection and rebound movements; oscillation in the longitudinal and transverse directions is not transmitted to the vehicle frame, or only to a very moderate extent.

The movements of wheels 16 and 17 either in the longitudinal direction on account of the springs acting in the horizontal plane, or in the transverse direction due to the rotation either about a longitudinal axis or about a transverse axis, take place without any interaction between these movements and the wheels remain strictly in the same position relative to the road, their planes remaining constantly parallel.

What I claim is:

1. An axle for supporting the wheels of a vehicle, which comprises a hollow tubular member, horizontal transverse shafts secured on the vehicle frame and supporting the ends of said tubular member, arms secured endwise of said tubular member, spring means connecting said arms to said frame, a tapered housing secured through its larger end to the middle of said tubular element, a hub secured to the other, small end of said housing and adapted to pivot about a longitudinal axis, a pair of wheel supports, and means for resiliently connecting in a horizontal plane said hub to said wheel supports.

2. An axle for supporting wheels mounted on a vehicle frame, comprising a hollow tubular member, an arm rigid with each end of said tubular member, spring means resiliently connecting said arms to said frame, horizontal shafts secured transversely to said frame and receiving said tubular member to permit the resilient pivoting movement thereof about said shafts, a hollow housing rigid with and at right angles to said tubular member, a hub mounted on the other end of said housing and adapted to pivot about a longitudinal axis, a torsion spring secured to said tubular member and said hub, a pair of wheel-carrying members, spring means adapted to deflect in the horizontal plane, characterized by a substantial inertia in the vertical plane and secured at one end to said hub and at the other end to said wheel-carrying members, and resilient means for controlling longitudinal oscillation.

3. A device for resiliently mounting a pair of wheels on a vehicle frame, which comprises a tapered housing located in the longitudinal median axis of the vehicle, a transverse tubular member solid with one end of said tapered housing and mounted to pivot freely about a transverse axis of said frame, resilient means for damping out the oscillation of said tubular member, a hub adapted to pivot about the other free end of said tapered housing, other means for damping out the oscillation of said hub, resilient members pivoted on, and extending laterally from said hub for longitudinal deflection, said wheels being pivoted on the outer ends of said resilient members.

4. A device for resiliently mounting in three directions of a couple of wheels on a vehicle frame, which comprises a tapered housing disposed in the longitudinal median axis of the vehicle, a transverse tubular member solid with one end of said tapered housing, a pair of aligned pivot-pins solid with the longitudinal side members of the vehicle frame, said tubular member being pivotally mounted on said pivot-pins, damping means pivotally attached at one end on said transverse tubular member and at the other end on said longitudinal side members, a hub pivotally mounted on the free end of said tapered housing, a torsion bar having one end secured to said transverse tubular member and the other end secured to said hub, said torsion bar having its axis inclined relative to the axis of said tapered housing, and parallel leaf springs extending laterally from, and pivoted in a common plane on, said hub on either side thereof and having their outer ends pivoted on the wheel supports.

References Cited in the file of this patent
UNITED STATES PATENTS

| | | |
|---|---|---|
| 1,345,421 | Vleet et al. | July 6, 1920 |
| 2,015,311 | Jonkhoff | Sept. 24, 1935 |
| 2,090,561 | Wagner | Aug. 17, 1937 |